E. H. SHINN.
ATTACHMENT FOR VEHICLE LAMPS.
APPLICATION FILED DEC. 18, 1912.
1,061,020.
Patented May 6, 1913.
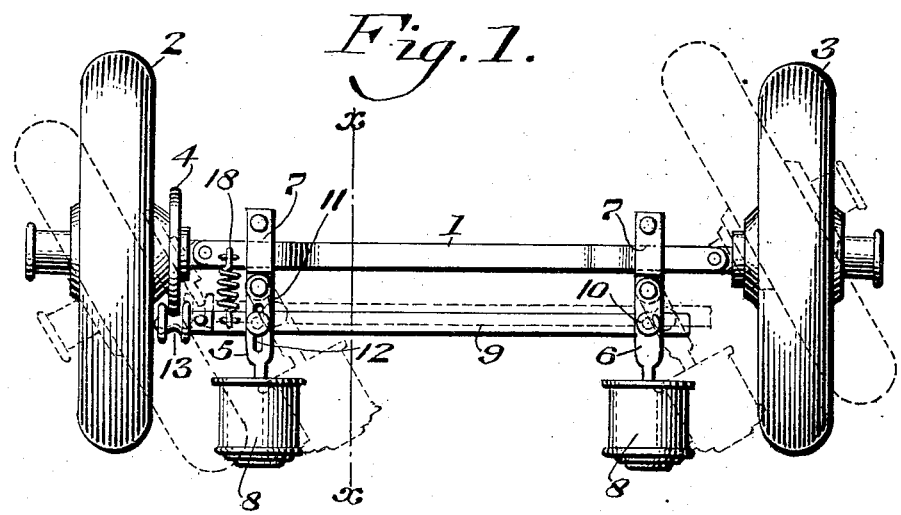
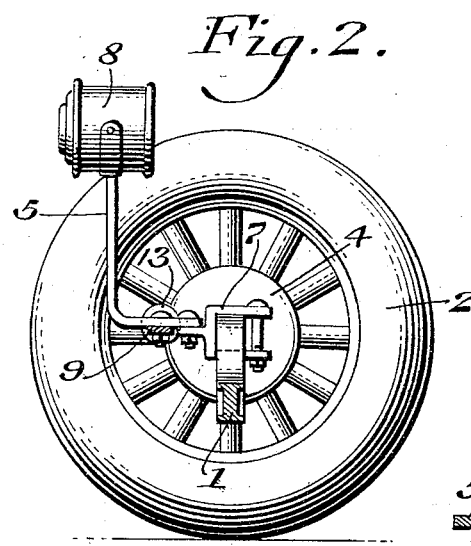
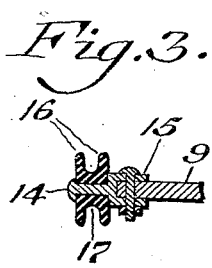
WITNESSES
INVENTOR
Elwood H. Shinn,
BY Wiedersheim & Fairbanks
ATTORNEYS

UNITED STATES PATENT OFFICE.

ELWOOD H. SHINN, OF MASONVILLE, NEW JERSEY.

ATTACHMENT FOR VEHICLE-LAMPS.

1,061,020. Specification of Letters Patent. Patented May 6, 1913.

Application filed December 18, 1912. Serial No. 737,423.

*To all whom it may concern:*

Be it known that I, ELWOOD H. SHINN, a citizen of the United States, and resident of Masonville, in the county of Burlington, State of New Jersey, have invented a new and useful Attachment for Vehicle-Lamps, of which the following is a specification.

My invention relates to a new and useful attachment for vehicle lamps, whereby the said lamps would be turned depending on the direction in which the wheels are turned, in order that the rays of light therefrom will be directed forward in the proper direction, that is in the actual direction of travel.

It further consists of other novel features of construction all as will be hereinafter fully set forth.

The annexed drawings and the following description set forth in detail one mechanical form embodying the invention, such detail construction being but one of various mechanical forms in which the principle of the invention may be used.

Figure 1 represents a plan view of a portion of a vehicle showing my invention applied thereto. Fig. 2 represents a sectional view on line x—x, Fig. 1. Figs. 3 and 4 represent sectional views of details, on an enlarged scale and in detached position.

Similar numerals of reference indicate corresponding parts in the figures.

Referring to the drawings:—1 designates the axle of a vehicle, to which the steering wheels 2 and 3 are pivoted in any suitable or desired manner, it being understood that the said axle, wheels, and coacting parts may be of any suitable or desired construction. Suitably connected with one of the steering wheels, in the present instance, the wheel 2, is a disk or plate 4, which is suitably spaced or offset from the said wheel and which disk, it will be understood, rotates with the said wheel and moves therewith, as the said wheel is turned for changing the direction of travel of the motor, it being understood that any suitable means for operating the wheels for guiding the vehicle may be employed, and I have omitted the same in the drawings, for the sake of clearness. 5 and 6 designate arms which are pivotally supported adjacent the said axle, 1. In the present instance I have shown the same as being pivoted to a clip 7, secured directly to the axle 1, although it will be evident that any suitable support for the arms may be utilized or any means for connecting the same with said support, said arms being adapted to be suitably pivoted with respect to the wheels or to the motor vehicle body in order that the lamps 8 carried thereby will be suitably positioned in order to direct the rays of light therefrom, at the proper height. 9 designates a bar which is movably connected with the said arms 5 and 6. As here shown the said bar 9 is movably connected with the arm 6 by the pivot 10, and is movably connected with the bar 5 through the pin 11 and slot 12, in order that the said bar 9 and arm 5 may move properly with respect to each other.

13 designates means carried by the bar which is adapted for locking or holding engagement with the disk 4. As here shown, I have mounted a journal 14 on the bar 9, by means of a clip 15, said journal 14 carrying the holding means 13, which is adapted to rotate on said journal 14 and is provided with the ears or extensions 16 forming the groove 17, therebetween, in which is adapted to be seated the disk 4, in order that the said ears 16 will engage the opposite sides of said disk for connecting these parts together, while permitting rotary movement therebetween. By this means it will be understood that as the wheels 2 and 3 are turned for varying the direction of travel, the disk 4 will be turned in the corresponding manner and by reason of the engagement of the engaging means 13 therewith, the said disk 4 will move the bar 9 in either direction, depending upon that of the wheel 2, carrying with it the arms 5 and 6, and thus the lamps 8, so that the rays of light therefrom will be projected forwardly in the actual direction of travel of the motor at all times. It will be understood that the pin and slot connection 11 and 12 between the arms, and one of the arms as 5 will permit the proper movement of these parts therebetween. In some instances, it may be of advantage to provide means for assisting in retaining the holding means 13 in proper position with respect to the disk 4, and for this purpose I have provided a spring 18, one end of which is connected with a suitable stationary point and the other end of which is connected with the bar 9, in order that the tension of the said spring will hold the engaging means 13 and the disk 4 in suitable position with respect to each other to insure the proper movement of the lamps 8. While I have shown a coiled spring, it will be understood that any form may be employed.

Having thus described my invention, what I claim as new and desire to secure by Letters Patent, is:—

1. In a device of the character stated, an axle, steering wheels pivoted to said axle, arms pivotally supported adjacent said axle, lamps carried by said arms, a bar movably connected with said arms, a disk rotatable and movable with one of said wheels and means carried by said bar and in engagement with the opposite sides of said disk for connecting the latter with said bar.

2. In a device of the character stated, an axle, arms pivotally supported adjacent said axle, lamps carried by said arms, a bar movably connected with said arms, a disk rotatable and movable with one of said wheels, means carried by said bar and in engagement with the opposite sides of said disk for connecting the latter with said bar and means for assisting in holding the said means and disk in engagement.

3. In a device of the character stated, an axle, steering wheels pivoted to said axle, arms pivotally supported adjacent said axle, lamps carried by said arms, a bar movably connected with said arms, a disk rotatable and movable with one of said wheels and offset thereupon, and a rotatable engaging means carried by said bar and in engagement with opposite sides of said disk for connecting the latter with said bar.

4. In a device of the character stated, an axle, steering wheels pivoted to said axle, an arm pivotally supported adjacent said axle, a lamp carried by said arm, a bar movably connected with said arm, a member rotatable and movable with one of said wheels, and means in suitable connection with said member to be controlled by lateral movement of said member in either direction, to impart similar movement to said bar whereby said lamp is turned to correspond to the positions of said wheel.

ELWOOD H. SHINN.

Witnesses:
GEORGE H. HORNER,
HOWARD L. WEEDEN.

Copies of this patent may be obtained for five cents each, by addressing the "Commissioner of Patents, Washington, D. C."